United States Patent
Chang (10) Patent No.: US 10,359,544 B2
(45) Date of Patent: Jul. 23, 2019

(54) LONG-WAVE INFRARED ANTI-REFLECTIVE LAMINATE

(71) Applicant: Tzu-Chiang Chen, Taoyuan (TW)

(72) Inventor: Le-Yen Chang, Taoyuan (TW)

(73) Assignee: Tzu-Chiang Chen, Taoyuan (TW)

( * ) Notice: Subject to any disclaimer, the term of this patent is extended or adjusted under 35 U.S.C. 154(b) by 0 days.

(21) Appl. No.: 16/008,814

(22) Filed: Jun. 14, 2018

(65) Prior Publication Data

US 2018/0364397 A1 Dec. 20, 2018

(30) Foreign Application Priority Data

Jun. 20, 2017 (TW) .............................. 106120475 A (51) Int. Cl.
*G02B 1/115* (2015.01)
*G02B 5/28* (2006.01)

(52) U.S. Cl.
CPC .............. *G02B 1/115* (2013.01); *G02B 5/281* (2013.01)

(58) Field of Classification Search
CPC .............. G02B 1/11–118; G02B 5/281; H01L 31/02168; F24S 70/30; C03C 17/3482; C03C 17/3423; C03C 17/3429; C03C 17/3435; C03C 17/34; C03C 17/3405; C03C 17/3411; C03C 17/225; C03C 17/30

See application file for complete search history.

(56) References Cited

U.S. PATENT DOCUMENTS

| | | | |
|---|---|---|---|
| 6,294,822 B1* | 9/2001 | Nakata | H01L 31/02167 257/461 |
| 2010/0000591 A1* | 1/2010 | Anderson | C03C 17/3417 136/244 |
| 2015/0355382 A1* | 12/2015 | Henn | G02B 1/115 428/216 |

FOREIGN PATENT DOCUMENTS

| TW | 201103156 A1 | 1/2011 |
|---|---|---|
| TW | I546194 B | 8/2016 |
| TW | I554780 B | 10/2016 |
| TW | I569977 B | 2/2017 |

OTHER PUBLICATIONS

Moghadam et al., "Design and fabrication of multi-layers infrared antireflection coating consisting of ZnS and Ge on ZnS substrate", Infrared Physics & Technology, vol. 75, Mar. 2016, pp. 18-21.

* cited by examiner

*Primary Examiner* — Cara E Rakowski
*Assistant Examiner* — Christopher A Lamb, II
(74) *Attorney, Agent, or Firm* — Pai Patent & Trademark Law Firm; Chao-Chang David Pai (57) ABSTRACT

A long-wave infrared anti-reflective laminate includes a silicon substrate and an anti-reflective composite layer. The anti-reflective composite layer is disposed on the silicon substrate and has at least one first anti-reflective membrane. The at least one first anti-reflective membrane includes a first silicon nitride layer and a first silicon dioxide layer. The first silicon nitride layer is disposed between the silicon substrate and the first silicon dioxide layer. The thickness ratio of the first silicon nitride layer to the first silicon dioxide layer ranges from 175 to 225. The anti-reflective composite layer can be applied on the optical instrument to raise the transmitting rate of the silicon substrate. The transmitting rate of the long-wave infrared anti-reflective (Continued)

laminate is over 90% within the wave band from 8 μm to 12 μm.

18 Claims, 5 Drawing Sheets

LONG-WAVE INFRARED ANTI-REFLECTIVE LAMINATE

CROSS-REFERENCE TO RELATED APPLICATION

Pursuant to 35 U.S.C. § 119(a), this application claims the benefits of the priority to Taiwan Patent Application No. 106120475, filed Jun. 20, 2017. The content of the prior application is incorporated herein by its entirety.

BACKGROUND OF THE INVENTION

1. Field of the Invention

The present invention relates to an anti-reflective layer, and more particularly to a long-wave infrared anti-reflective laminate (LWIR laminate).

2. Description of Related Art

Most optical elements of optical instrument or photonic systems, such as solar cells, laser heads, lenses, or plane mirrors, were coated with multiple anti-reflective layers to prevent the reflection of the incident light when the incident light passed through the optical elements. Therefore, the anti-reflective multilayer could prevent the optical loss caused by reflection and did not need to lengthen the bandwidth to receive incident light, thus enhancing the working efficiency of the optical elements.

Common coating materials of the infrared optical materials included single crystal germanium, single crystal silicon, zinc sulfide (ZnS), and zinc selenide (ZnSe). The transmitting wave band of the common coating materials stated above were slightly different but roughly overlapped on 0.5 µm to 14 µm, which was similar with the wave band of the LWIR ranging from 8 µm to 12 µm. Among them, zinc sulfide and zinc sulfide coated with germanium were relatively widely used but the high cost of zinc sulfide and germanium made the coating process remain high-priced.

In the semiconductor industry, silicon was a popular material and could be used as a window of the infrared element, lens, or filter due to its high hardness and good thermal stability. However, the high refractivity of silicon (refractivity of silicon: 4.24) reduced the transmitting rate of incident light passing through the silicon substrate. Therefore, the silicon substrate needed to be coated with dozens of anti-reflective layers for correcting the optical path of the incident light in order to promote the transmitting rate of the silicon substrate. Nevertheless, the coating process of the dozens of anti-reflective layers on the silicon substrate had the disadvantages of high complexity and high cost.

SUMMARY OF THE INVENTION

Regarding the problems stated above, the main objective of the invention is to provide a long-wave infrared anti-reflective laminate with high transmitting rate to solve the complexity and the high cost caused by the excessive anti-reflective layers.

The long-wave infrared anti-reflective laminate includes a silicon substrate and an anti-reflective composite layer. The silicon substrate has an upper surface and a lower surface opposite to each other. The anti-reflective composite layer is disposed on the silicon substrate and the anti-reflective composite layer has at least one first anti-reflective membrane. The at least one first anti-reflective membrane is disposed on the silicon substrate and comprises a first silicon nitride layer and a first silicon dioxide layer. The first silicon nitride layer is disposed between the silicon substrate and the first silicon dioxide layer. The thickness ratio of the first silicon nitride layer to the first silicon dioxide layer ranges from 175 to 225.

By means of choosing silicon as the substrate material, disposing the first silicon nitride layer and the first silicon dioxide layer on the silicon substrate, and controlling the thickness ratio of the first silicon nitride layer to the first silicon dioxide layer, dozens of anti-reflective layers are no more required in the long-wave infrared anti-reflective laminate of the present invention, and thus the transmittance of the silicon substrate is improved.

Preferably, the refractive index of the first silicon nitride layer is from 1.70 to 2.30 and the refractive index of the first silicon dioxide layer is from 1.21 to 1.50.

In an embodiment, the anti-reflective composite layer has two first anti-reflective membranes. The two first anti-reflective membranes are respectively disposed on the upper surface and the lower surface of the silicon substrate.

To enhance the anti-reflection effect of the silicon substrate, the anti-reflective composite layer has at least one second anti-reflective membrane. The at least one second anti-reflective membrane is disposed on the first anti-reflective membrane and has a second silicon nitride layer and a second silicon dioxide layer. The second silicon nitride layer is disposed between the first silicon dioxide layer and the second silicon dioxide layer. The thickness ratio of the second silicon nitride layer to the second silicon dioxide layer ranges from 175 to 225.

In an embodiment, the anti-reflective composite layer has two second anti-reflective membranes. The two second anti-reflective membranes are respectively disposed on the two first anti-reflective membranes. Each of the two second anti-reflective membranes comprises a second silicon nitride layer and a second silicon oxide layer. The second silicon nitride layer is disposed between the first silicon dioxide layer and the second silicon dioxide layer. The thickness ratio of the second silicon nitride layer to the second silicon dioxide layer ranges from 175 to 225.

"The thickness ratio of the first silicon nitride layer to the first silicon dioxide layer" means the value of the thickness of the first silicon nitride layer divided by the thickness of the first silicon dioxide layer. Likewise, "the thickness ratio of the second silicon nitride layer to the second silicon dioxide layer" means the value of the thickness of the second silicon nitride layer divided by the thickness of the second silicon dioxide layer.

Preferably, the thickness of the second silicon nitride layer is 25 nm to 35 nm thicker than the thickness of the first silicon nitride layer. More preferably, the thickness of the second silicon nitride layer is 30 nm thicker than the thickness of the first silicon nitride layer.

Specifically, the total thickness of the anti-reflective composite layer is from 603 µm to 2472 µm.

DETAILED DESCRIPTION OF THE PREFERRED EMBODIMENT

The long-wave infrared anti-reflective laminate of the present invention comprises a silicon substrate and at least one first anti-reflective membrane.

Example 1: Unilateral Double Layer Anti-Reflective Laminate

Figure 1:
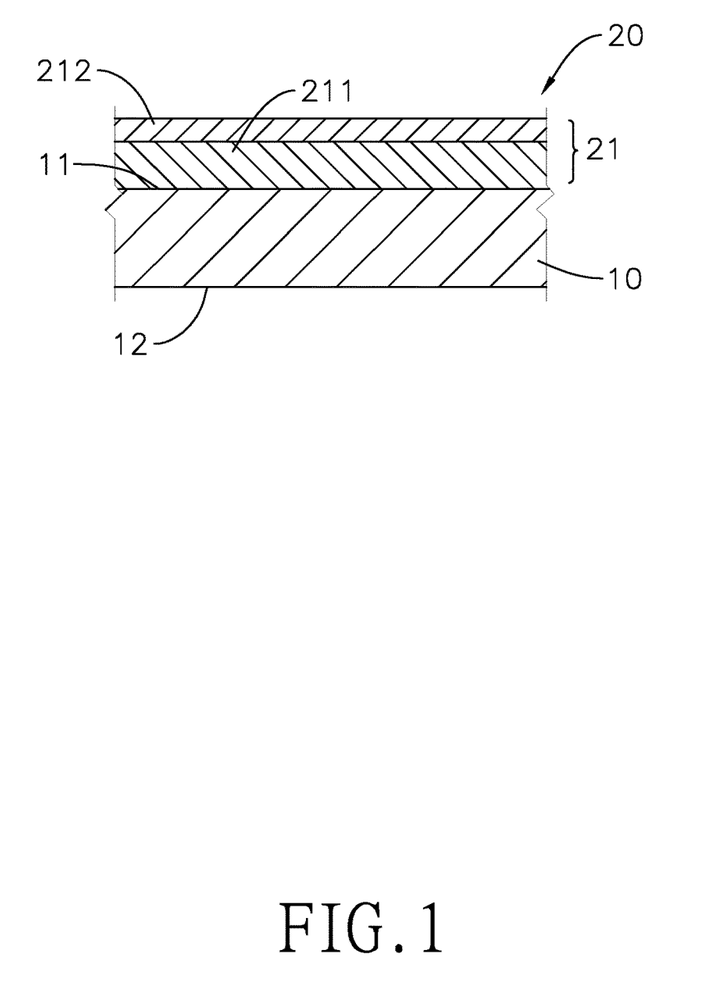
FIG. 1 is a cross-sectional view of the long-wave infrared anti-reflective laminate of Example 1.

With reference to FIG. 1, the long-wave infrared anti-reflective laminate comprised a silicon substrate 10 and an anti-reflective composite layer 20.

The silicon substrate 10 had an upper surface 11 and a lower surface 12 opposite to each other.

The anti-reflective composite layer 20 was disposed on the upper surface 11 of the silicon substrate 10. The anti-reflective composite layer 20 included a first anti-reflective membrane 21. The first anti-reflective membrane 21 was disposed on the upper surface 11 of the silicon substrate 10. The first anti-reflective membrane 21 had a first silicon nitride ($Si_3N_4$) layer 211 and a first silicon dioxide ($SiO_2$) layer 212. The first silicon nitride layer 211 was disposed between the silicon substrate 10 and the first silicon dioxide layer 212.

Specifically, the first silicon nitride layer 211 was formed on the upper surface 11 of the silicon substrate 10 by electron beam gun evaporation. The refractive index of the first silicon nitride layer 211 was 2.03 and the thickness of the first silicon nitride layer 211 was 600 nm. Similarly, the first silicon dioxide layer 212 was formed on the first silicon nitride layer 211 opposite the silicon substrate 10 by electron beam gun evaporation. The refractive index of the first silicon dioxide layer 212 was 1.46 and the thickness of the first silicon dioxide layer 212 was 3 nm. Therefore, the total thickness of the anti-reflective composite layer 20 was 603 nm and the thickness ratio of the first silicon nitride layer 211 to the first silicon dioxide layer 212 was 200.

Because the first silicon nitride layer 211 and the first silicon dioxide layer 212 were disposed on the upper surface 11 of the silicon substrate 10 only, the long-wave infrared anti-reflective laminate of Example 1 was abbreviated as "unilateral double layer anti-reflective laminate" in the specification.

Example 2: Bilateral Double Layer Anti-Reflective Laminate

Figure 2:
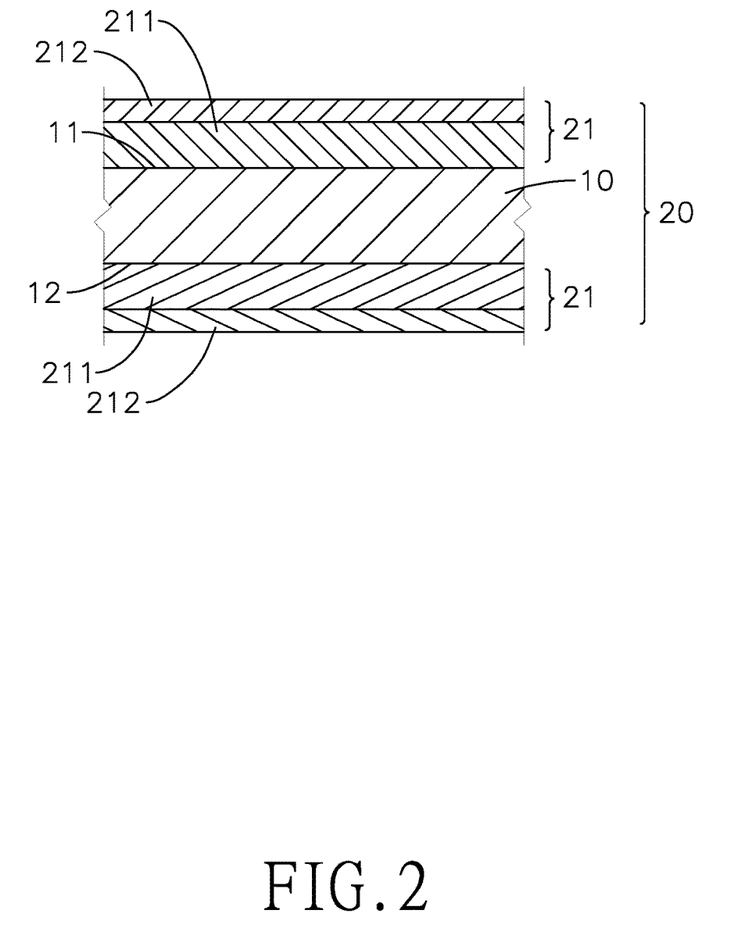
FIG. 2 is the cross-sectional view of the long-wave infrared anti-reflective laminate of Example 2.

With reference to FIG. 2, the long-wave infrared anti-reflective laminate of Example 2 was similar to that of Example 1. The difference resided in that the anti-reflective composite layer 20 of Example 2 had two first anti-reflective membranes 21.

The two first anti-reflective membranes 21 were respectively disposed on the upper surface 11 and the lower surface 12 of the silicon substrate 10. That is, both the upper surface 11 and the lower surface 12 of the silicon substrate 10 were disposed by the first silicon nitride layer 211 and the first silicon dioxide layer 212. Besides, each first silicon nitride layer 211 was disposed between the silicon substrate 10 and the first silicon dioxide layer 212. Therefore, the total thickness of the anti-reflective composite layer 20 was 1206 nm and the long-wave infrared anti-reflective laminate of Example 2 was abbreviated as "bilateral double layer anti-reflective laminate".

Example 3: Unilateral Four-Layer Anti-Reflective Laminate

Figure 3:
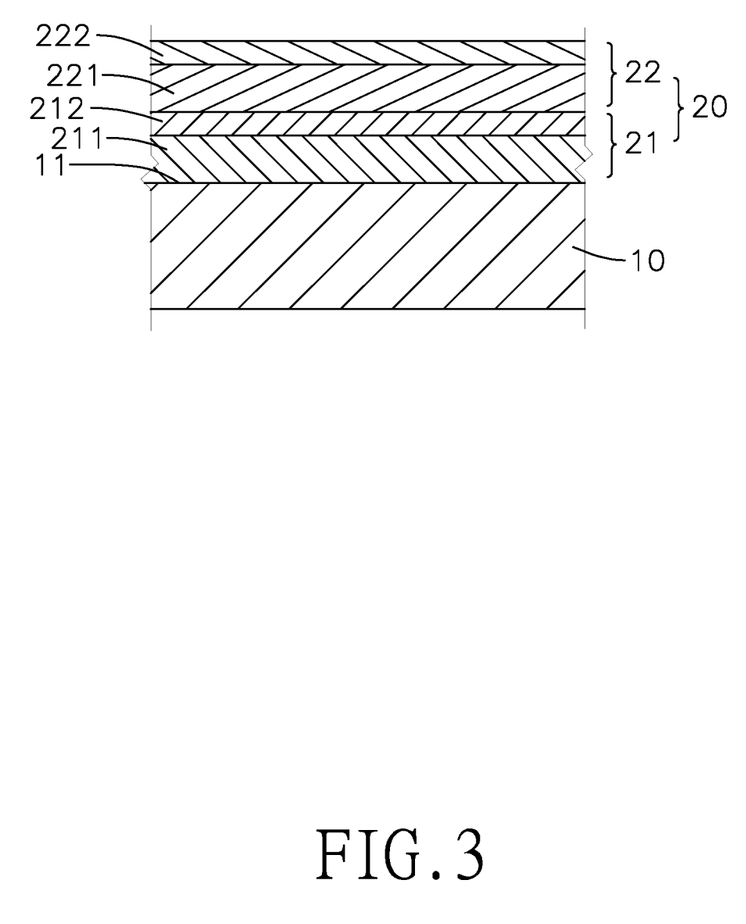
FIG. 3 is the cross-sectional view of the long-wave infrared anti-reflective laminate of Example 3.

With reference to FIG. 3, the long-wave infrared anti-reflective laminate of Example 3 was similar to that of Example 1. The difference resided in that the anti-reflective composite layer 20 of Example 3 had one first anti-reflective membrane 21 and one second anti-reflective membrane 22.

The first anti-reflective membrane 21 was disposed on the upper surface 11 of the silicon substrate 10 as in Example 1. The second anti-reflective membrane 22 was disposed on the first anti-reflective membrane 21 opposite to the silicon substrate 10. The second anti-reflective membrane 22 included a second silicon nitride layer 221 and a second silicon dioxide layer 222. The second silicon nitride layer 221 was disposed on the first silicon dioxide layer 212 of the first anti-reflective membrane 21 opposite to the first silicon nitride layer 211. The second silicon dioxide layer 222 was disposed on the second silicon nitride layer 221 opposite to the first anti-reflective membrane 21. That is, the second silicon nitride layer 221 was disposed between the first silicon dioxide 212 and the second silicon dioxide layer 222.

Specifically, the refractive index of the second silicon nitride layer 221 was 2.03 and the thickness of the second silicon nitride layer 221 was 630 nm. Similarly, the refractive index of the second silicon dioxide layer 222 was 1.46 and the thickness of the second silicon dioxide layer 222 was 3 nm. Therefore, the total thickness of the anti-reflective composite layer 20 was 1236 nm and the thickness ratio of the second silicon nitride layer 221 to the second silicon dioxide layer 222 was 210.

Because the upper surface 11 of the silicon substrate 10 had the first silicon nitride layer 211, the first silicon dioxide layer 212, the second silicon nitride layer 221, and the second silicon dioxide layer 222 disposed thereon, the long-wave infrared anti-reflective laminate of Example 3 was abbreviated as "unilateral four-layer anti-reflective laminate" in the specification.

Example 4: Bilateral Four-Layer Anti-Reflective Laminate

Figure 4:
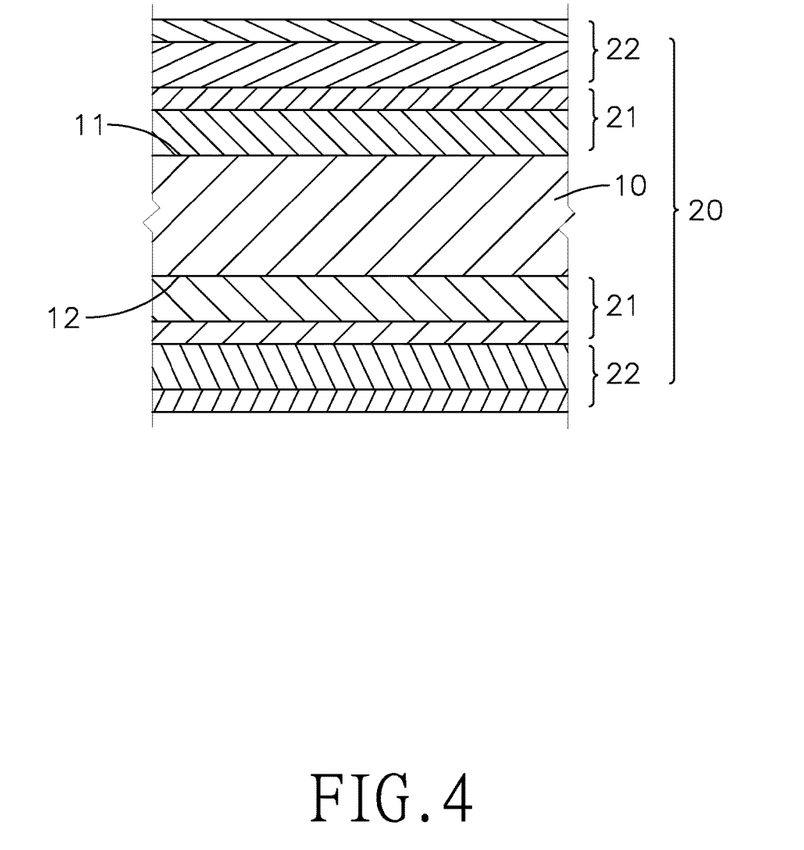
FIG. 4 is the cross-sectional view of the long-wave infrared anti-reflective laminate of Example 4.

With reference to FIG. 4, the long-wave infrared anti-reflective laminate of Example 4 was similar to that of Example 3. The difference resided in that the anti-reflective composite layer 20 of Example 4 had two first anti-reflective membranes 21 and two second anti-reflective membranes 22.

The two first anti-reflective membranes 21 were respectively disposed on the upper surface 11 and the lower surface 12 of the silicon substrate 10. The two second anti-reflective membranes 22 were respectively disposed on the two first anti-reflective membranes 21 opposite to the silicon substrate 10.

Therefore, the total thickness of the anti-reflective composite layer 20 was 2472 nm and the long-wave infrared anti-reflective laminate of Example 4 was abbreviated as "bilateral four-layer anti-reflective laminate".

Comparative Example 1: Single Silicon Substrate

To compare the transmitting rate of the long-wave infrared anti-reflective laminate of the present invention with that of the single silicon substrate, a single silicon substrate without the anti-reflective composite layer 20 was prepared.

Test Example 1: Measurement of Transmitting Rate

Figure 5:
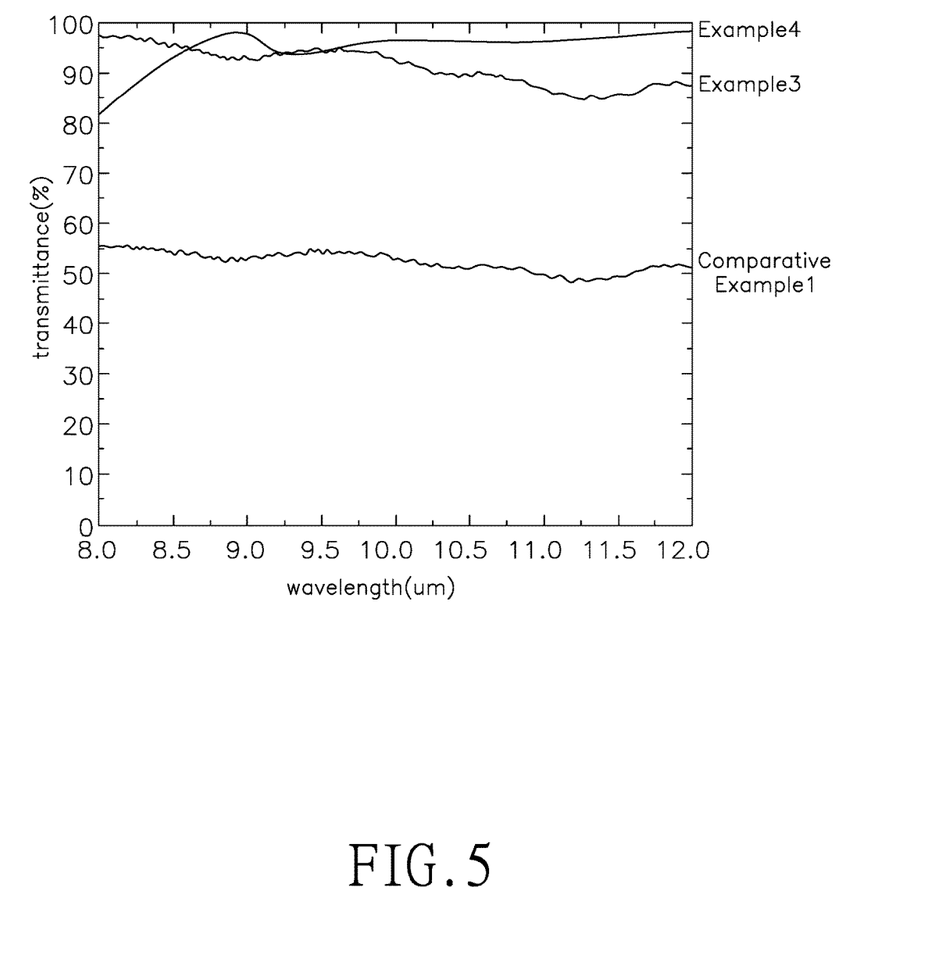
FIG. 5 is a FTIR spectrum diagram of Examples 3 and 4 and Comparative Example 1.

A Fourier transform infrared spectrometer (FTIR) was used to measure the average transmitting rate of the long-wave infrared anti-reflective laminate of Example 3 and the single silicon substrate of Comparative Example 1 at wave band ranging from 8 μm to 12 μm and the results were shown in FIG. 5. The average transmitting rate measured by FTIR at wave band ranging from 8 μm to 12 μm was abbreviated as average transmitting rate.

The highest intensity of the infrared ray radiated by the human body was detected at a wavelength of 10 μm. Therefore, the transmitting rates of the long-wave infrared anti-reflective laminate of Example 3 and the single silicon substrate of Comparative Example 1 were also measured at the wavelength of 10 μm. The transmitting rate measured by FTIR at the wavelength of 10 μm was abbreviated as $T_{10\ \mu m}$.

The transmitting rate of the long-wave infrared anti-reflective laminate is highest at 10 μm. When the transmitting rate of the incident light with a wavelength of 10 μm is higher, the long-wave infrared anti-reflective laminate of the present invention was applied in optical instrument for the human body, the optical instrument being capable of detecting stronger optical signal intensity.

According to the result, the average transmitting rate and the $T_{10\ \mu m}$ of the long-wave infrared anti-reflective laminate of Example 3 were 91.37% and 92.45%, respectively. The average transmitting rate and the $T_{10\ \mu m}$ of the long-wave infrared anti-reflective laminate of Comparative Example 1 were 52.37% and 52.66%, respectively.

Compared to Comparative Example 1, the average transmitting rate of Example 3 detected by FTIR was raised by 39% and the $T_{10\ \mu m}$ of Example 3 detected by FTIR was raised by 40%. Apparently, the optical instrument including the unilateral four-layer anti-reflective laminate of Example 3 could have higher transmitting rate and could detect stronger optical signals.

Further, looking into the results of Example 3, the values of the average transmitting rate and the $T_{10\ \mu m}$ were close, which means that the transmitting rate of the long-wave infrared anti-reflective laminate was steady and would not distinctly change with wavelength shifts.

Test Example 2: Simulation of Transmitting Rate

The average transmitting rate and the $T_{10\ \mu m}$ of Example 4 were simulated by Simplex model established in Essential Macleod software. The average transmitting rate simulated by software at wave band ranging from 8 μm to 12 μm was abbreviated as average transmitting rate. The transmitting rate simulated by software at the wavelength of 10 μm was abbreviated as $T_{10\ \mu m}$. Based on the simulated result, the average transmitting rate and the $T_{10\ \mu m}$ of Example 4 were 95.16% and 96.48%, respectively.

Compared to Comparative Example 1, the average transmitting rate of Example 4 simulated by software was raised by 43% and the $T_{10\ \mu m}$ of Example 4 simulated by software was raised by 44%. Apparently, the optical instrument including the bilateral four-layer anti-reflective laminate of Example 4 could have higher transmitting rate and could detect stronger optical signals.

Further, the values of the average transmitting rate and the $T_{10\ \mu m}$ were close, which means that the transmitting rate of the long-wave infrared anti-reflective laminate was steady and would not distinctly change with wavelength shifts.

Based on the results of Test Examples 1 and 2, regardless that the transmitting rate was measured by FTIR (Example 3) or simulated by software (Example 4), the transmitting rates of the long-wave infrared anti-reflective laminate were higher than those of the single silicon substrate (Comparative Example 1). That is, the disposition of the anti-reflective composite layer 20 on the silicon substrate 10 could raise the transmitting rate. Besides, the transmitting rates of Examples 3 and 4 did not distinctly change within the wave band of 8 μm to 12 μm.

In conclusion, the technical feature of disposing the anti-reflective composite layer 20 can raise the transmitting rate of the silicon substrate 10 and replace the present high cost coating material, such as zinc sulfide and zinc sulfide coated with germanium. Therefore, the present invention can solve the problems of disposing dozens of anti-reflective membranes.

What is claimed is:

1. A long-wave infrared anti-reflective laminate comprising:
   a silicon substrate having an upper surface and a lower surface opposite to each other;
   an anti-reflective composite layer disposed on the silicon substrate, the anti-reflective composite layer having at least one first anti-reflective membrane; the at least one first anti-reflective membrane disposed on the silicon substrate and comprising a first silicon nitride layer and a first silicon dioxide layer; the first silicon nitride layer disposed between the silicon substrate and the first silicon dioxide layer; the thickness ratio of the first silicon nitride layer to the first silicon dioxide layer ranging from 175 to 225,
   wherein the wave band of the long-wave infrared ranges from 8 μm to 12 μm.

2. The long-wave infrared anti-reflective laminate as claimed in claim 1, wherein the refractive index of the first silicon nitride layer is from 1.70 to 2.30 and the refractive index of the first silicon dioxide layer is from 1.21 to 1.50.

3. The long-wave infrared anti-reflective laminate as claimed in claim 2, wherein the total thickness of the anti-reflective composite layer is from 603 μm to 2472 μm.

4. The long-wave infrared anti-reflective laminate as claimed in claim 1, wherein the at least one first anti-reflective membrane includes two said first anti-reflective membranes; the two first anti-reflective membranes are respectively disposed on the upper surface of the silicon substrate and the lower surface of the silicon substrate.

5. The long-wave infrared anti-reflective laminate as claimed in claim 4, wherein the total thickness of the anti-reflective composite layer is from 603 μm to 2472 μm.

6. The long-wave infrared anti-reflective laminate as claimed in claim 4, wherein the anti-reflective composite layer includes two said second anti-reflective membranes; the two second anti-reflective membranes are respectively disposed on the two first anti-reflective membranes; each of the two second anti-reflective membranes has a second silicon nitride layer and a second silicon dioxide layer; the second silicon nitride layer is disposed between the first silicon dioxide layer and the second silicon dioxide layer; the thickness ratio of the second silicon nitride layer to the second silicon dioxide layer ranges from 175 to 225.

7. The long-wave infrared anti-reflective laminate as claimed in claim 6, wherein the total thickness of the anti-reflective composite layer is from 603 μm to 2472 μm.

8. The long-wave infrared anti-reflective laminate as claimed in claim 6, wherein the thicknesses of the second silicon nitride layers are each 25 nm to 35 nm thicker than the thicknesses of the first silicon nitride layers.

9. The long-wave infrared anti-reflective laminate as claimed in claim 8, wherein the total thickness of the anti-reflective composite layer is from 603 μm to 2472 μm.

10. The long-wave infrared anti-reflective laminate as claimed in claim 8, wherein the thicknesses of the second silicon nitride layers are each 30 nm thicker than the thicknesses of the first silicon nitride layers.

11. The long-wave infrared anti-reflective laminate as claimed in claim 10, wherein the total thickness of the anti-reflective composite layer is from 603 μm to 2472 μm.

12. The long-wave infrared anti-reflective laminate as claimed in claim 1, wherein the anti-reflective composite layer has at least one second anti-reflective membrane; the at least one second anti-reflective membrane is disposed on the at least one first anti-reflective membrane and has a second silicon nitride layer and a second silicon dioxide layer; the second silicon nitride layer is disposed between the first silicon dioxide layer and the second silicon dioxide layer; the thickness ratio of the second silicon nitride layer to the second silicon dioxide layer ranges from 175 to 225.

13. The long-wave infrared anti-reflective laminate as claimed in claim 12, wherein the total thickness of the anti-reflective composite layer is from 603 μm to 2472 μm.

14. The long-wave infrared anti-reflective laminate as claimed in claim 12, wherein the thickness of the second silicon nitride layer is 25 nm to 35 nm thicker than the thickness of the first silicon nitride layer.

15. The long-wave infrared anti-reflective laminate as claimed in claim 14, wherein the total thickness of the anti-reflective composite layer is from 603 μm to 2472 μm.

16. The long-wave infrared anti-reflective laminate as claimed in claim 14, wherein the thickness of the second silicon nitride layer is 30 nm thicker than the thickness of the first silicon nitride layer.

17. The long-wave infrared anti-reflective laminate as claimed in claim 16, wherein the total thickness of the anti-reflective composite layer is from 603 μm to 2472 μm.

18. The long-wave infrared anti-reflective laminate as claimed in claim 1, wherein the total thickness of the anti-reflective composite layer is from 603 μm to 2472 μm.

* * * * *